United States Patent
Hobbs et al.

(10) Patent No.: US 8,942,881 B2
(45) Date of Patent: Jan. 27, 2015

(54) GESTURE-BASED AUTOMOTIVE CONTROLS

(75) Inventors: Nicholas Kenneth Hobbs, San Francisco, CA (US); Liang-Yu (Tom) Chi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/437,730

(22) Filed: Apr. 2, 2012

(65) Prior Publication Data

US 2013/0261871 A1 Oct. 3, 2013

(51) Int. Cl.
*B60W 30/00* (2006.01)
*G06F 7/00* (2006.01)
*G05D 1/00* (2006.01)

(52) U.S. Cl.
USPC ................................................. 701/28; 701/1

(58) Field of Classification Search
USPC ............ 701/1, 2, 23, 26, 28, 45, 47; 700/245; 715/852; 340/435, 457.1; 345/158; 348/48
See application file for complete search history.

(56) References Cited

U.S. PATENT DOCUMENTS

| | | | |
|---|---|---|---|
| 6,173,066 B1 | 1/2001 | Peurach et al. | |
| 6,299,308 B1 | 10/2001 | Voronka et al. | |
| 6,681,031 B2 | 1/2004 | Cohen et al. | |
| 6,792,339 B2* | 9/2004 | Basson et al. | 701/1 |
| 6,801,637 B2 | 10/2004 | Voronka et al. | |
| 6,950,534 B2 | 9/2005 | Cohen et al. | |
| 7,036,094 B1 | 4/2006 | Cohen et al. | |
| 7,050,606 B2 | 5/2006 | Paul et al. | |
| 7,121,946 B2 | 10/2006 | Paul et al. | |
| 7,295,904 B2 | 11/2007 | Kanevsky et al. | |
| 7,373,218 B2* | 5/2008 | Sakagami | 700/245 |
| 7,460,690 B2 | 12/2008 | Cohen et al. | |
| 7,526,362 B2* | 4/2009 | Kim et al. | 700/245 |
| 7,668,340 B2 | 2/2010 | Cohen et al. | |
| 7,684,592 B2 | 3/2010 | Paul et al. | |

(Continued)

FOREIGN PATENT DOCUMENTS

| | | |
|---|---|---|
| EP | 1830244 | 9/2007 |
| JP | 2010-184600 A | 8/2010 |
| WO | 2009-155465 A1 | 12/2009 |

OTHER PUBLICATIONS

International Search Report for corresponding international application No. PCT/US2013/024543 mailed May 13, 2013.

(Continued)

*Primary Examiner* — Tuan C. To
*Assistant Examiner* — Yuri Kan
(74) *Attorney, Agent, or Firm* — McDonnell Boehnen Hulbert & Berghoff LLP

(57) ABSTRACT

Methods and apparatuses for gesture-based controls are disclosed. In one aspect, a method is disclosed that includes maintaining a correlation between a plurality of predetermined gestures, in combination with a plurality of predetermined regions of a vehicle, and a plurality of functions. The method further includes recording three-dimensional images of an interior portion of the vehicle and, based on the three-dimensional images, detecting a given gesture in a given region of the vehicle, where the given gesture corresponds to one of the plurality of predetermined gestures and the given region corresponds to one of the plurality of predetermined regions. The method still further includes selecting, based on the correlation, a function associated with the given gesture in combination with the given region and initiating the function in the vehicle.

20 Claims, 12 Drawing Sheets

(56) References Cited

U.S. PATENT DOCUMENTS

| | | | |
|---|---|---|---|
| 7,702,130 B2 | 4/2010 | Im et al. | |
| 7,852,262 B2 | 12/2010 | Namineni et al. | |
| 7,873,448 B2 * | 1/2011 | Takeda et al. | 701/26 |
| 8,214,098 B2 * | 7/2012 | Murray et al. | 701/23 |
| 8,230,362 B2 * | 7/2012 | Couch | 715/852 |
| 2005/0063564 A1 | 3/2005 | Yamamoto et al. | |
| 2005/0278098 A1 * | 12/2005 | Breed | 701/45 |
| 2007/0057781 A1 * | 3/2007 | Breed | 340/457.1 |
| 2007/0182528 A1 * | 8/2007 | Breed et al. | 340/435 |
| 2008/0040004 A1 * | 2/2008 | Breed | 701/45 |
| 2008/0046150 A1 * | 2/2008 | Breed | 701/45 |
| 2008/0065291 A1 | 3/2008 | Breed | |
| 2008/0231926 A1 * | 9/2008 | Klug et al. | 359/23 |
| 2009/0278915 A1 * | 11/2009 | Kramer et al. | 348/48 |
| 2010/0057305 A1 * | 3/2010 | Breed | 701/47 |
| 2010/0066676 A1 * | 3/2010 | Kramer et al. | 345/158 |
| 2010/0235034 A1 * | 9/2010 | Higgins | 701/28 |
| 2011/0050589 A1 | 3/2011 | Yan | |
| 2011/0286676 A1 | 11/2011 | El Dokor | |
| 2012/0173047 A1 * | 7/2012 | Bernstein et al. | 701/2 |
| 2012/0197464 A1 * | 8/2012 | Wang et al. | 701/2 |
| 2012/0283894 A1 * | 11/2012 | Naboulsi | 701/1 |
| 2012/0310466 A1 * | 12/2012 | Fairfield et al. | 701/28 |

OTHER PUBLICATIONS

Written Opinion for corresponding international application No. PCT/US2013/024543 mailed May 13, 2013.

* cited by examiner

| GESTURE | REGION | FUNCTION |
|---|---|---|
| SWIPE UP | AIR-CONDITIONING VENT | INCREASE FAN SPEED |
| SWIPE DOWN | AIR-CONDITIONING VENT | DECREASE FAN SPEED |
| SWIPE RIGHT | AIR-CONDITIONING VENT | INCREASE TEMPERATURE |
| SWIPE LEFT | AIR-CONDITIONING VENT | DECREASE TEMPERATURE |
| WAVE FORWARD | OPEN-AIR DRIVER LEFT SIDE | MOVE DRIVER SEAT FORWARD |
| SWIPE UP | DRIVER WINDOW | CLOSE WINDOW |
| SWIPE DOWN | DRIVER WINDOW | OPEN WINDOW |

FIG. 5

GESTURE-BASED AUTOMOTIVE CONTROLS

BACKGROUND

In some cases, a driver of a vehicle may wish to perform a number of functions at once. For example, in addition to maneuvering the vehicle, the driver may wish to enter a navigation destination, change the temperature in the vehicle, or change the volume of music playing in the vehicle. Other functions are possible as well.

SUMMARY

In one aspect, an example method is disclosed that includes maintaining a correlation between a plurality of predetermined gestures, in combination with a plurality of predetermined regions of a vehicle, and a plurality of functions, such that each gesture in the plurality of predetermined gestures, in combination with a particular region of the plurality of predetermined regions, is associated with a particular function in the plurality of functions. The example method further includes recording three-dimensional images of an interior portion of the vehicle and, based on the three-dimensional images, detecting a given gesture in a given region of the vehicle, where the given gesture corresponds to one of the plurality of predetermined gestures and the given region corresponds to one of the plurality of predetermined regions. The example method still further includes selecting, based on the correlation, a function associated with the given gesture in combination with the given region, and initiating the function in the vehicle.

In another aspect, an example non-transitory computer-readable medium is disclosed having stored therein instructions executable by a computing device to cause the computing device to perform the functions of the example method described above.

In yet another aspect, an example vehicle is disclosed that includes a camera configured to record three-dimensional images of an interior portion of the vehicle, at least one processor, and data storage. The data storage includes a correlation between a plurality of predetermined gestures, in combination with a plurality of predetermined regions of a vehicle, and a plurality of functions, such that each gesture in the plurality of predetermined gestures, in combination with a particular region of the plurality of predetermined regions, is associated with a particular function in the plurality of functions. The data storage further includes instructions executable by the at least one processor to record three-dimensional images of an interior portion of the vehicle, and, based on the three-dimensional images, detect a given gesture in a given region of the vehicle, where the given gesture corresponds to one of the plurality of predetermined gestures and the given region corresponds to one of the plurality of predetermined regions. The instructions are further executable by the at least one processor to select, based on the correlation, a function associated with the given gesture in combination with the given region, and initiate the function in the vehicle.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5 shows an example correlation between gestures, regions, and functions, in accordance with an embodiment.

DETAILED DESCRIPTION

Figure 1:
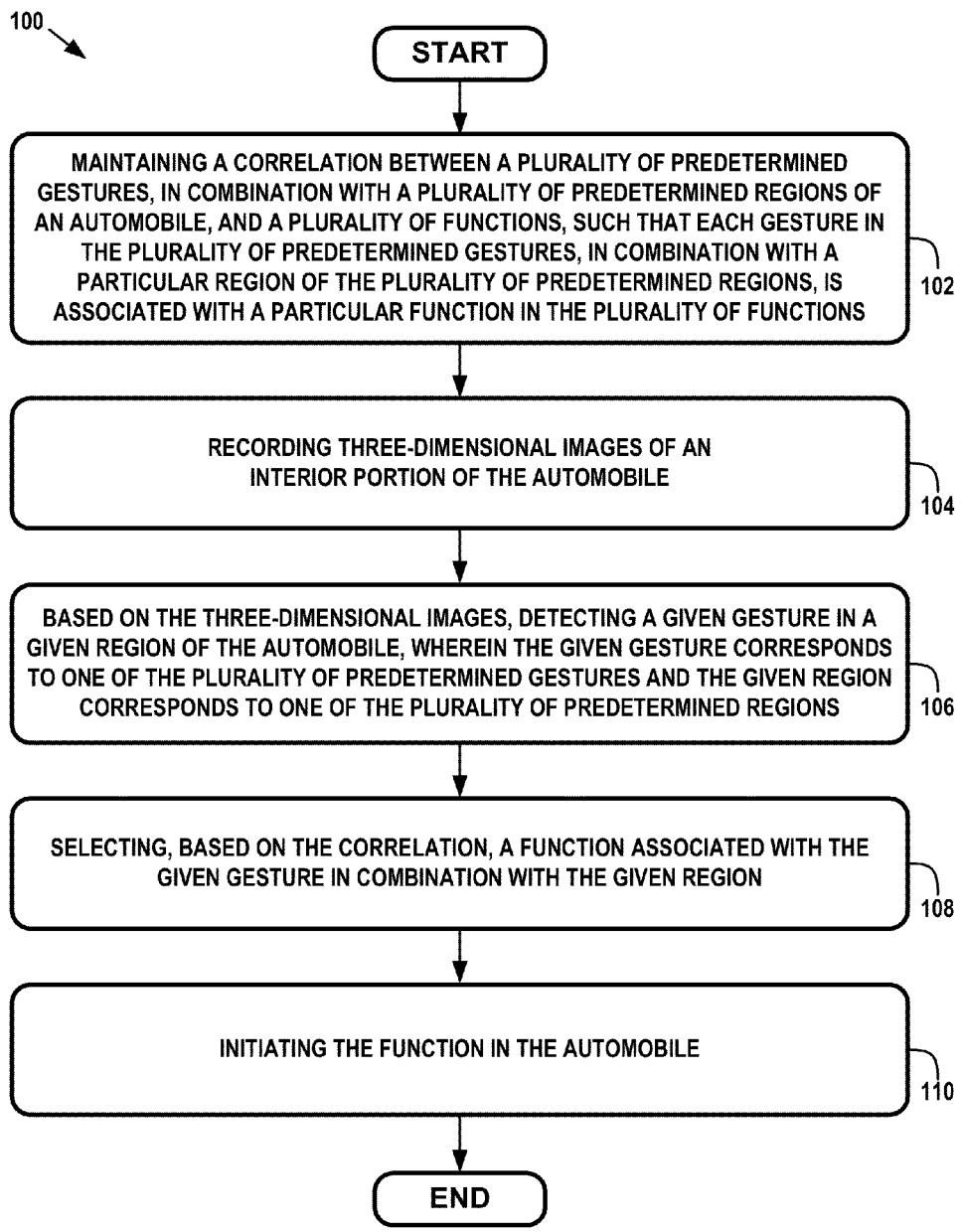
FIG. 1 is a flow chart illustrating an example method, in accordance with an embodiment.

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

As noted above, in some cases, while a user is maneuvering a vehicle, the user may wish to perform a number of additional functions, such as navigating to a destination, changing the temperature in the vehicle, or changing the volume of music playing in the vehicle. Other functions are possible as well.

Performing these additional functions may require the user to locate and manipulate one or more controls in the vehicle. For example, in order to change the temperature in the vehicle, the user may locate a button or knob on a dashboard of the vehicle that controls a heater. As another example, in order to change the position of a seat in the vehicle, the user may locate a device on the side of the seat that controls the position of the seat. Other controls are possible as well.

While the user is maneuvering the vehicle, it may be difficult for the user to locate the controls. Further, it may be difficult for the user to manipulate the controls. Additionally, it may be unsafe to include controls in some regions of the vehicle that are closest to the user. For example, it may be unsafe to include controls on a steering wheel or other surface from which an airbag may be deployed. As a result, the regions of the vehicle where controls may be included may be limited.

Disclosed are methods and systems for gesture-based controls in a vehicle. The vehicle may maintain a correlation between a plurality of predetermined gestures, in combination with a plurality of predetermined regions of the vehicle, and a plurality of functions, such that each gesture in the plurality of predetermined gestures, in combination with a particular region of the plurality of predetermined regions, is associated with a particular function in the plurality of functions.

The user may perform a gesture in a region of the vehicle. Example gestures include swiping, pointing, tapping, grasping, and pinching. Example regions include a steering wheel, an air-conditioning vent, and an ear of the user. Other gestures and regions are possible as well, as described below.

The vehicle may include one or more cameras configured to record three-dimensional images of the gesture. The vehicle may detect the gesture and the region based on the three-dimensional images. Further, the vehicle may select, based on the correlation, a function that is associated with the gesture and the region. Then, the vehicle may initiate the function in the vehicle.

Method 100 shown in FIG. 1 presents an embodiment of a method that, for example, could be used with the vehicles described herein. Method 100 may include one or more operations, functions, or actions as illustrated by one or more of blocks 102-110. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

As shown, the method 100 begins at block 102 where a vehicle maintains a correlation between a plurality of predetermined gestures, in combination with a plurality of predetermined regions of a vehicle, and a plurality of functions, such that each gesture in the plurality of predetermined gestures, in combination with a particular region of the plurality of predetermined regions, is associated with a particular function in the plurality of functions.

The predetermined gestures may include, for example, any gesture that an occupant of the vehicle may make with his or her hands, fingers, arms, legs, head, or combination thereof. The occupant could be either a driver of the vehicle or a passenger. For instance, the predetermined gestures may include swiping, tapping, pointing, grasping, pinching, or waving gestures as well as predetermined positions and movements of hands and/or fingers, such as those used in American Sign Language. Other predetermined gestures are possible as well.

The predetermined regions may include, for example, any region of the vehicle. For instance, the predetermined regions may include interior surfaces of the vehicle, such as a steering wheel, dashboard, air-conditioning vent, seat, headrest, arm rest, or a rear-view mirror of the vehicle, as well as surfaces of an occupant, such as an ear, arm, or shoulder of the occupant. Other interior surfaces are possible as well. Further, the predetermined regions may include open-air regions of the vehicle, such as an open-air region between an occupant's head and the steering wheel, an open-air region between an occupant's head and a window, and an open-air region between an occupant and a seat. Other open-air regions are possible as well. Further, other predetermined regions are possible as well.

The functions may include, for example, any function of the vehicle. For instance, the functions may include modifying a volume or music selection on an audio system in the vehicle, modifying a volume or content selection on an entertainment system or in-vehicle display, modifying a fan speed or temperature on an air conditioning system, heater, or climate control system in the vehicle, modifying a seat position of a seat in the vehicle, stopping, starting, or modifying a speed of windshield wipers in the car, opening, closing, or modifying a position of a window in the car, modifying a speed of a cruise control system in the vehicle, opening, closing, or modifying a position of a sunscreen in the vehicle, or opening, closing, or modifying a position of a sunroof in the vehicle. Other functions are possible as well.

An example correlation is further described below in connection with FIG. 5.

The method 100 continues at block 104 where the vehicle records three-dimensional images of an interior portion of the vehicle. To this end, the vehicle may include one or more cameras configured to record three-dimensional images. The camera(s) may include, for example, a depth camera and/or a three-dimensional laser scanner. The camera(s) may be positioned anywhere in the vehicle, such as on a ceiling of the vehicle, the dashboard of the vehicle, or the rear-view mirror of the vehicle. The camera(s) may be positioned elsewhere in the vehicle as well. In embodiments where more than one camera is used, the cameras may be positioned in different positions in the vehicle, and may record three-dimensional images from their different positions.

The method 100 continues at block 106 where, based on the three-dimensional images, the vehicle detects a given gesture in a given region of the vehicle, where the given gesture corresponds to one of the plurality of predetermined gestures and the given region corresponds to one of the plurality of predetermined regions. The given gesture may include, for example, any of the example gestures described above. Similarly, the given region may include, for example, any of the example regions described above.

The vehicle may detect the given gesture by, for example, monitoring the three-dimensional images for the appearance of the hands, fingers, arms, legs, and/or head of one or more occupants. To this end, the hands, fingers, arms, legs, and/or head of an occupant may have a known and/or recognizable shape, texture, color, depth, and/or pattern. For instance, the vehicle may monitor the three-dimensional images for the appearance of an object or item having a color or tone that matches or resembles one or more predetermined colors and/or tones considered to be representative of a variety of skin colors.

Alternatively or additionally, the vehicle may use background subtraction techniques to detect a gesture involving the hands, fingers, arms, legs, and/or head of an occupant. To this end, the vehicle may compare the three-dimensional images with a reference three-dimensional image in an effort to detect changes between the three-dimensional images and the reference three-dimensional image. The reference three-dimensional image may be, for example, a three-dimensional image showing the vehicle empty or showing an occupant in a typical driving position (e.g., both hands on the steering wheel) in the vehicle. Other reference three-dimensional images are possible as well. In order to detect changes between a three-dimensional image and the reference three-dimensional image, the wearable computing device may "subtract" the three-dimensional image from the reference three-dimensional image, such that common pixels cancel and differing pixels remain, indicating changes between the three-dimensional image and the reference three-dimensional image. The changes may, for example, indicate a gesture involving the hands, fingers, arms, legs, and/or head of an occupant.

Still alternatively or additionally, the vehicle may monitor the three-dimensional images to detect movement of the hands, fingers, arms, legs, and/or head of an occupant by, for example, monitoring an optical-flow differential of the three-dimensional images. For instance, when the hands, fingers, arms, legs, and/or head of an occupant are making a predetermined gesture, an apparent movement of the hands, fingers, arms, legs, and/or head will be significantly higher than the apparent movement of the rest of the vehicle. As a result, the optical-flow vectors of the hands, fingers, arms, legs, and/or head will, on average, have a greater magnitude than optical-flow vectors in the rest of the vehicle, thus creating an optical-flow differential between the hands, fingers, arms, legs, and/or head and the rest of the vehicle. Thus, by detecting the optical-flow differential, the vehicle may detect the movement of the hands, fingers, arms, legs, and/or head of an occupant.

It will be appreciated that the vehicle may detect the given gesture using other techniques as well.

The vehicle may detect the given region based on a position of the detected given gesture in the three-dimensional images. For example, the vehicle may compare the position of the detected given gesture in the three-dimensional images with positions corresponding to the plurality of predetermined regions in the correlation. Based on the comparison, the vehicle may determine that the detected given gesture is positioned near and/or within a position corresponding to the given region.

It will be appreciated that the vehicle may detect the given region using other techniques as well.

At block 108, the vehicle selects, based on the correlation, a function associated with the given gesture in combination with the given region. To this end, the vehicle may look up the given gesture in combination with the given region in the correlation, and may select from the correlation the function associated with the given gesture in combination with the given region.

At block 110, the vehicle initiates the function. The function may, for example, be any of the example functions described above.

In some embodiments, in addition to initiating the function, the vehicle may trigger a feedback to the user, such as an audible feedback, a visual feedback, and/or a haptic feedback. Such feedback may be particularly useful when the function is not immediately detectable by the user, such as a small decrease in the fan speed of the climate control system or a slight repositioning of a seat.

Further, in some embodiments, the vehicle may determine an extent of the given gesture. For example, if the given gesture is a swipe gesture, the vehicle may determine an extent of the swipe (e.g., how long the swipe is in space and/or time). The vehicle may then determine an operational parameter based on the extent. For example, for a greater extent, the vehicle may determine a greater operational parameter than for a lesser extent. The operational parameter may be, for example, proportional to, or approximately proportional to, the extent. In these embodiments, when the vehicle initiates the function the vehicle may initiate the function with the determined operational parameter.

For example, if the swipe gesture is in a region that includes a window, and the swipe gesture in the region that includes the window is associated with opening the window, the vehicle may determine an extent of the swipe and further may determine how far to open the window based on the extent of the swipe. For instance, the vehicle may open the window further for a longer swipe than for a shorter swipe.

As another example, if the swipe gesture is in a region that includes an air-conditioning vent, and the swipe gesture in the region that includes the air-conditioning vent is associated with lowering a temperature in the vehicle, the vehicle may determine an extent of the swipe and further may determine how much to lower the temperature in the vehicle based on the extent of the swipe. For instance, the vehicle may lower the temperature further for a longer swipe than for a shorter swipe.

Such an extent could be determined for gestures other than a swipe gesture as well. For example, if a tap gesture is in a region that includes a speaker, and the tap gesture in the region that includes the speaker is associated with lowering a volume of an audio system, the vehicle may determine an extent of the tap (e.g., how many taps, how long the tap is held, etc.) and further may determine how much to lower the volume of the audio system based on the extent of the tap. For instance, the vehicle may lower the volume more for more taps (or a longer tap) than for fewer taps (or a shorter tap).

In some embodiments, rather than determining the extent of the gesture and the corresponding operational parameter and then initiating the function with the determined operational parameter, the vehicle may instead continuously determine the extent of the gesture and update the corresponding operational parameter, and may continuously initiate the function with the updated operational parameter. For example, the vehicle may detect a cover gesture in a region that includes an air-conditioning vent (e.g., such that the air-conditioning vent is covered), and the cover gesture in the region that includes the air-conditioning vent may be associated with lowering a fan speed of the air conditioning system. Once the vehicle detects the cover gesture in the region that includes the air-conditioning vent, the vehicle may lower the fan speed (e.g., by a predetermined amount). As the vehicle continues to detect the cover gesture, the vehicle may continue to lower the fan speed (e.g., in increments of, for example, the predetermined amount, growing amounts, etc.). Once the vehicle detects that the cover gesture has ended, the vehicle may cease to lower the fan speed. As a result, during the cover gesture the vehicle may lower the fan speed by an amount that is based on the extent of the cover gesture.

In some embodiments, the vehicle may have difficulty detecting the given gesture and/or the given region. For example, the vehicle may determine that a confidence level of one or both of the given gesture and the given region is below a predetermined threshold. In these embodiments, the vehicle may request an occupant to repeat the given gesture in the given region. When the occupant repeats the given gesture in the given region, the vehicle may record additional three-dimensional images and may detect the given gesture and the given region based on the additional three-dimensional images (and, in some cases, the three-dimensional images previously recorded).

For purposes of illustration, a number of example implementations are described. It is to be understood, however, that the example implementations are illustrative only and are not meant to limiting. Other example implementations are possible as well.

Figure 2:
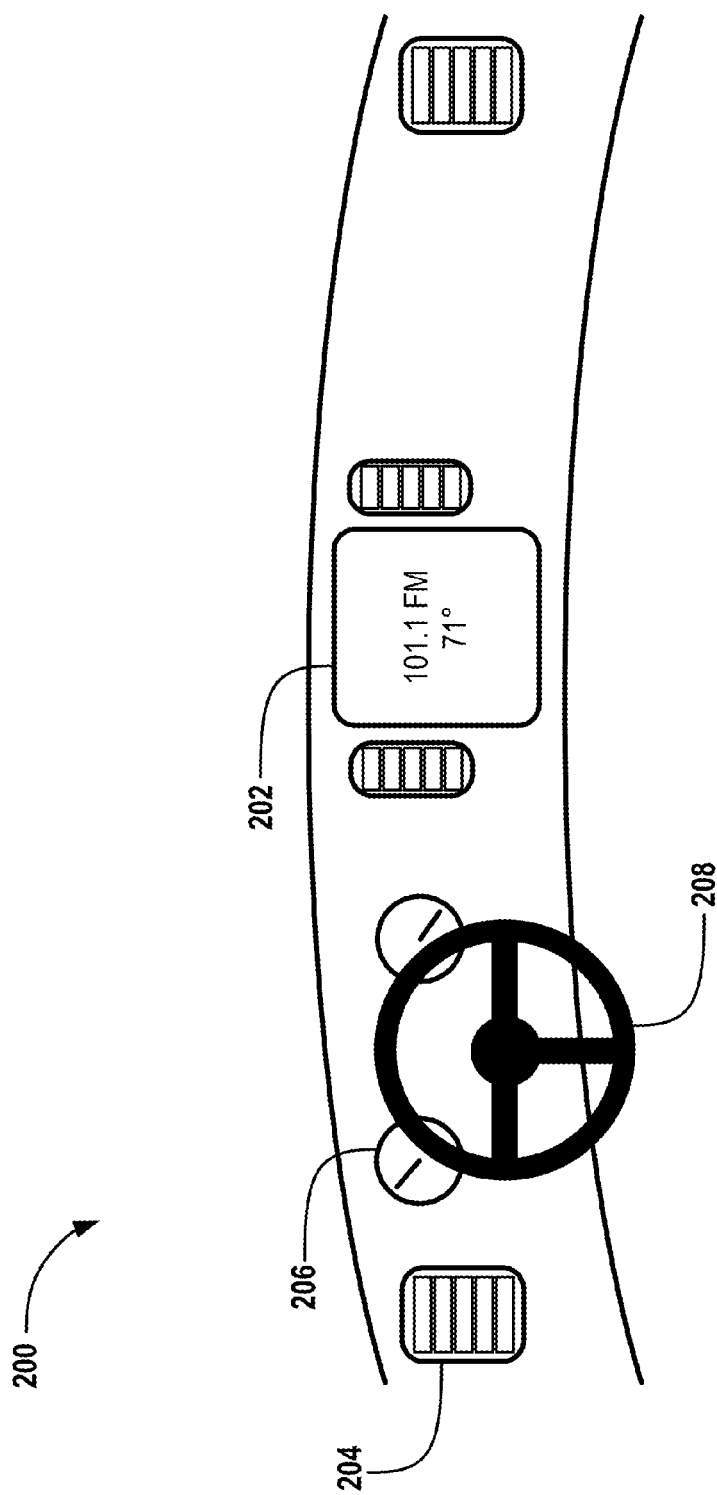
FIG. 2 is an image of an example dashboard of an example vehicle, in accordance with an embodiment.

FIG. 2 is an image of an example dashboard 200 of an example vehicle, in accordance with an embodiment. As shown, the example dashboard 200 includes a display 202 (e.g., a liquid crystal display (LCD), a light-emitting diode (LED) display, a touchscreen, etc.), an air-conditioning vent 204, a speedometer 206, and a steering wheel 208.

For purposes of illustration, the example implementations below are described in connection with dashboards similar to the example dashboard 200. It is to be understood, however, that the dashboards may include additional components instead of or in addition to those shown. Further, the components of the dashboards may be rearranged or removed. That is, the dashboards shown are not intended to be limiting, and other dashboards are possible as well.

FIGS. 3A-D illustrate an example implementation of the example method in which a gesture is used to control an air conditioning system in an example vehicle, in accordance with an embodiment. As shown, a user 300 is driving the vehicle. The vehicle may maintain a correlation between a plurality of predetermined gestures, in combination with a plurality of predetermined regions of the vehicle, and a plurality of functions, such that each gesture in the plurality of predetermined gestures, in combination with a particular region of the plurality of predetermined regions, is associated with a particular function in the plurality of functions, as described above. For example, the correlation may include a downward swiping gesture in a region that includes an air-conditioning vent associated with the function of decreasing a fan speed of an air conditioning system. Other examples are possible as well.

As shown, a fan speed indicator 302 on the display indicates that a fan speed of the air conditioning system in the vehicle is high. Further, a camera 304 is positioned on a ceiling of the vehicle. The camera 304 may be configured to record three-dimensional images of an interior portion of the vehicle. While only one camera 304 is shown, more than one camera could be used.

Figure 3A:
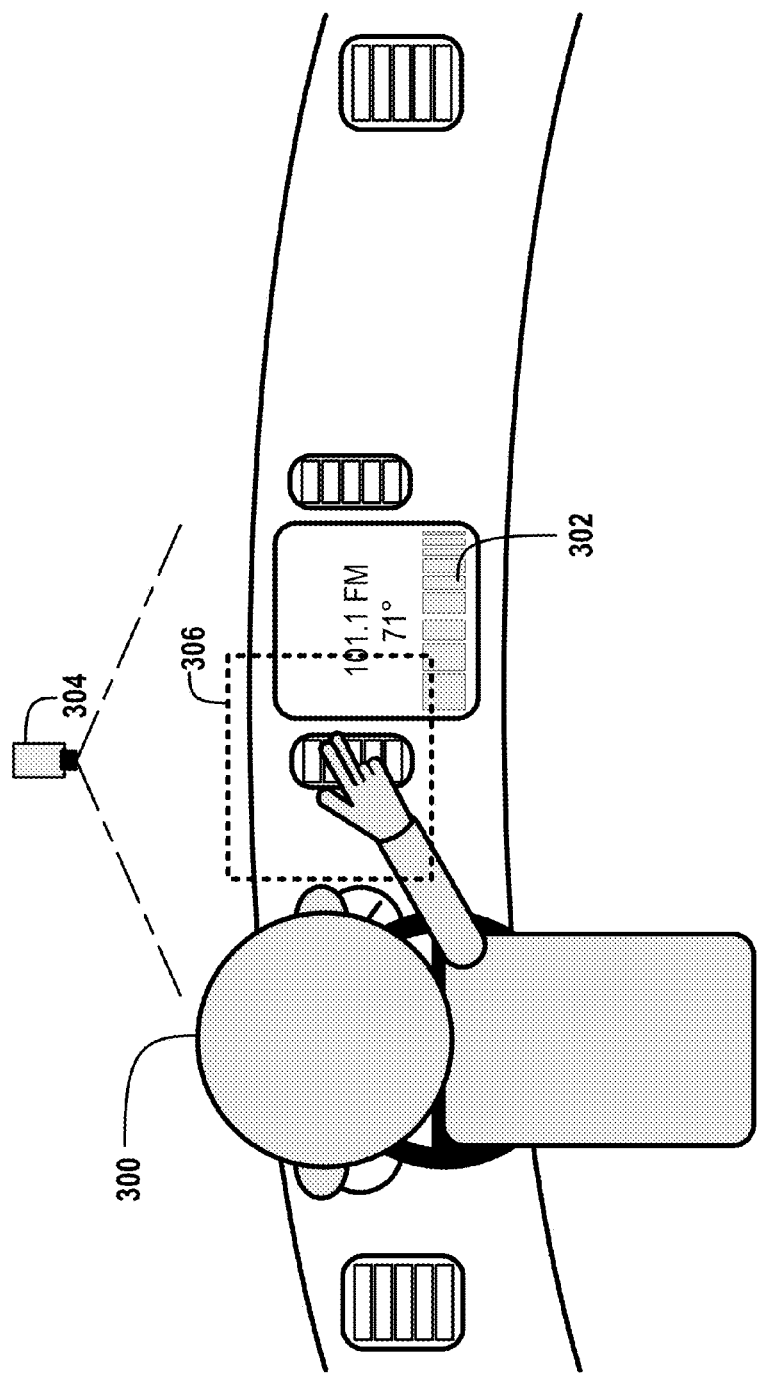
FIGS. 3A-D illustrate an example implementation of the example method in which a gesture is used to control an air conditioning system in an example vehicle, in accordance with an embodiment.
Figure 3C:
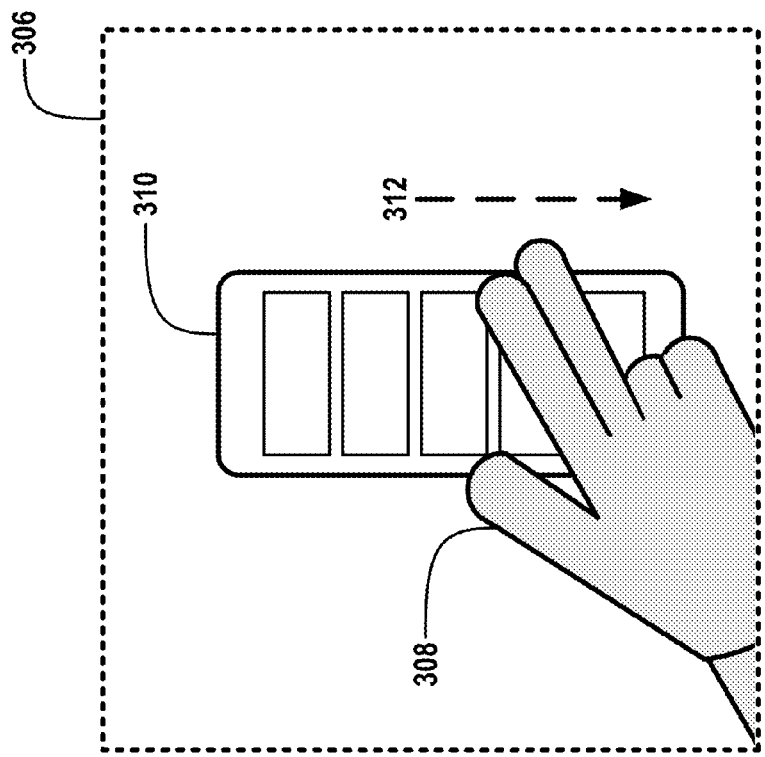
Figure 3B:
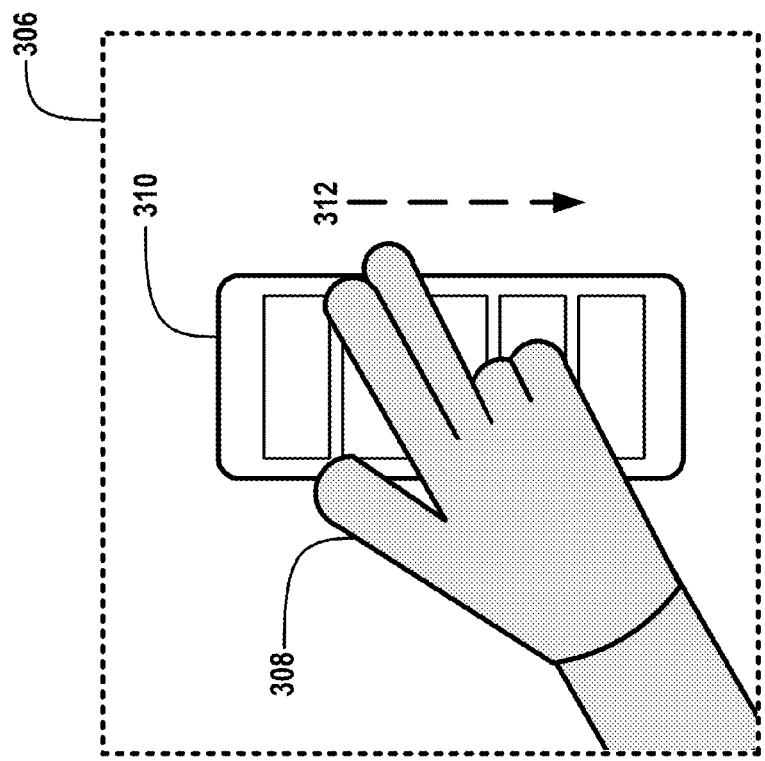

At some point, the user 300 may wish to lower the fan speed of the air conditioning system. To this end, the user 300 may make a downward swiping gesture in a region that includes an air-conditioning vent. This is illustrated in FIGS. 3B-C, which show a detailed view of a portion 306 of FIG. 3A. As shown in FIGS. 3B-3C, the user 300 is using his or her hand 308 to make a downward swiping gesture 312 on an air-conditioning vent 310.

The camera 304 may record three-dimensional images of the downward swiping gesture 312 in the region that includes an air-conditioning vent 310. Based on the three-dimensional images, the vehicle may detect the downward swiping gesture 312 in the region that includes the air-conditioning vent 310.

The vehicle may then select, based on the correlation, a function associated with the downward swiping gesture 312 in the region that includes the air-conditioning vent 310. For example, the downward swiping gesture 312 in the region that includes the air-conditioning vent 310 may be associated with the function of decreasing a fan speed of the air conditioning system, as described above. Other examples are possible as well.

Once the vehicle has selected the function from the correlation, the vehicle may initiate the function in the vehicle. That is, the vehicle may decrease the fan speed in the vehicle.

Figure 3D:
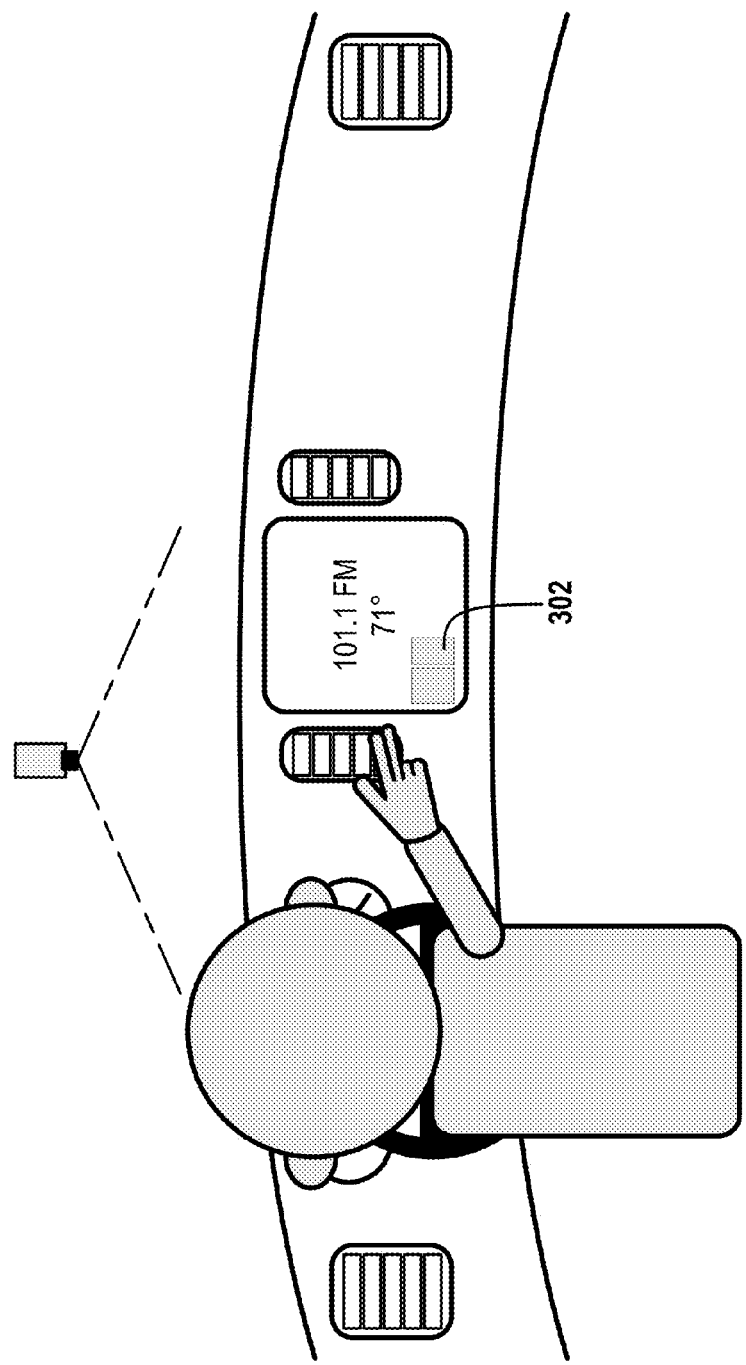

As shown in FIG. 3D, the fan speed indicator 302 on the display indicates that the fan speed of the air conditioning system in the vehicle has been decreased. The fan speed indicator 302 may serve as a visual feedback to the user 300, allowing the user 300 to confirm that the fan speed has been decreased. In some embodiments, the vehicle may trigger a haptic or audible feedback instead of or in addition to the visual feedback, or may not trigger any feedback at all.

In some embodiments, the vehicle may additionally determine an extent determining an extent of the downward swiping gesture 312 and may decrease the fan speed by an amount that is, for example, proportional to the extent.

Figure 4A:
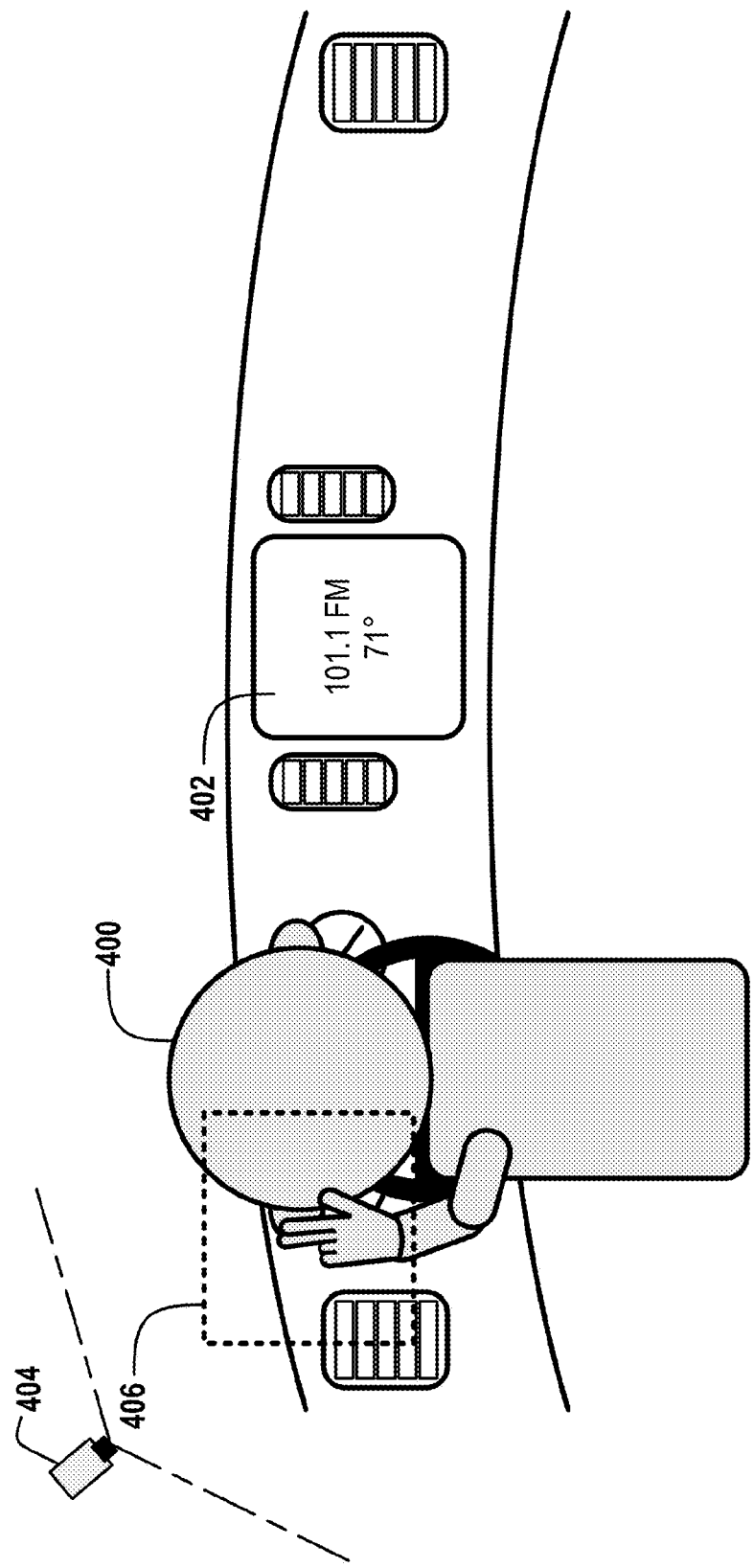
FIGS. 4A-C illustrate an example implementation of the example method in which a gesture is used to control an audio system in an example vehicle, in accordance with an embodiment.
Figure 4B:
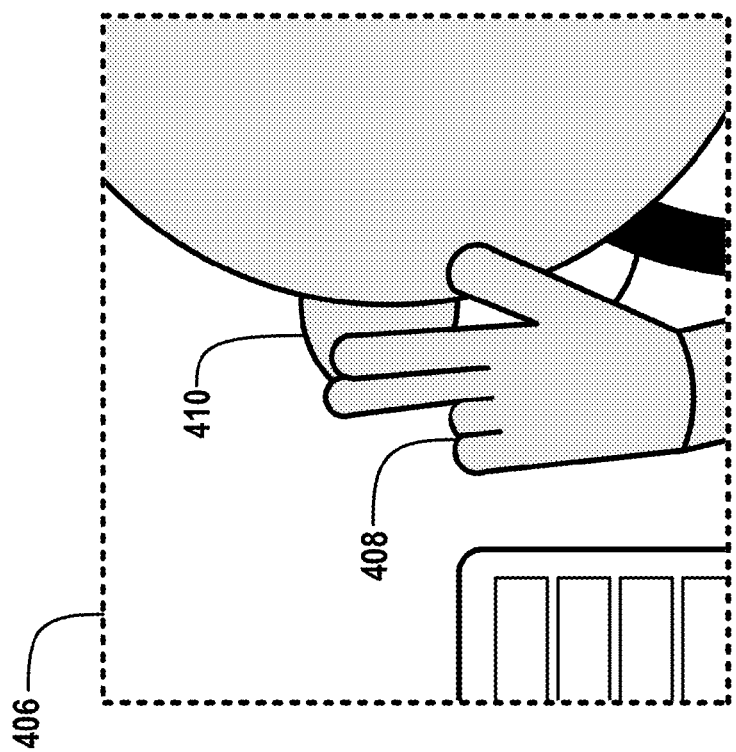
Figure 4C:
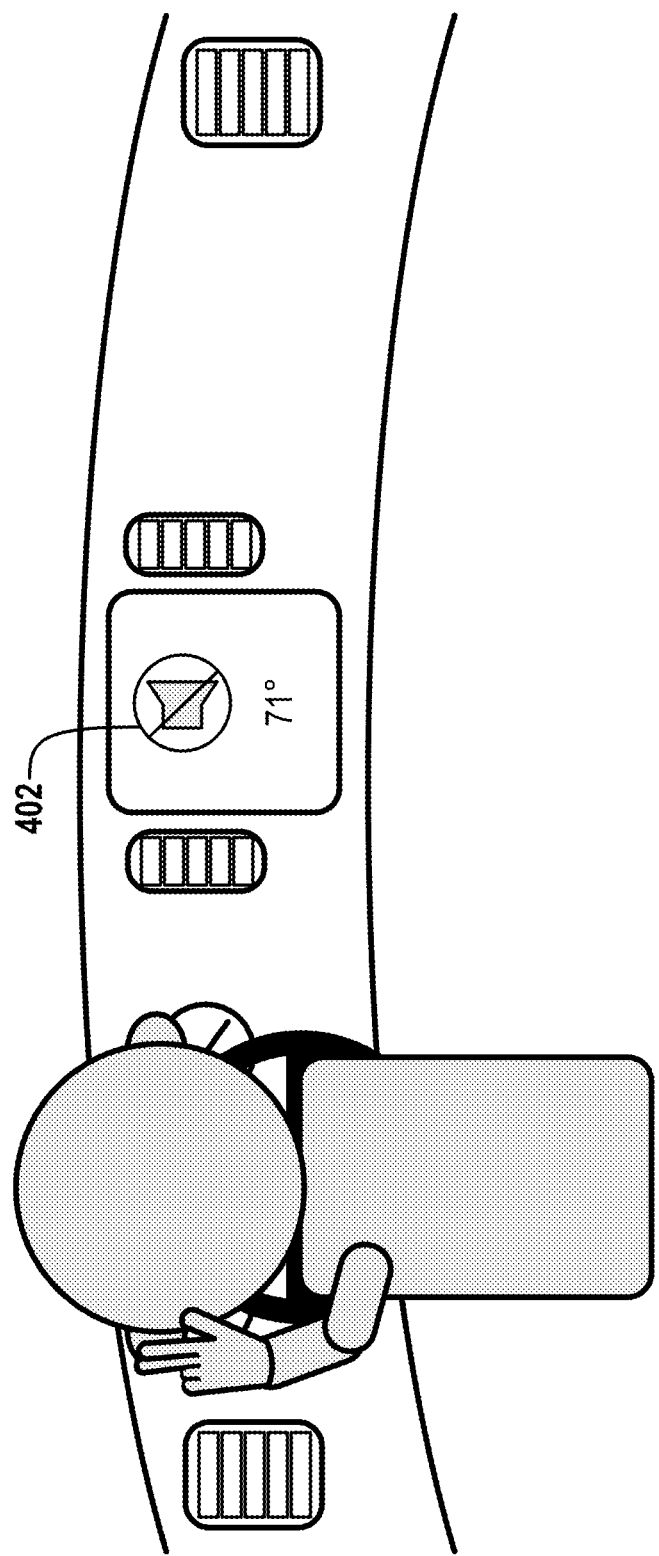

FIGS. 4A-C illustrate an example implementation of the example method in which a gesture is used to control an audio system in an example vehicle, in accordance with an embodiment. As shown, the user 400 is driving the vehicle. The vehicle may maintain a correlation between a plurality of predetermined gestures, in combination with a plurality of predetermined regions of the vehicle, and a plurality of functions, such that each gesture in the plurality of predetermined gestures, in combination with a particular region of the plurality of predetermined regions, is associated with a particular function in the plurality of functions, as described above. For example, the correlation may include a tapping gesture in a region that includes an ear of the user 400 associated with the function off turning of an audio system in the vehicle. Other examples are possible as well.

As shown, an audio system indicator 402 on the display indicates that the audio system is playing music from a radio station. Further, a camera 404 is positioned on a ceiling of the vehicle. The camera 404 may be configured to record three-dimensional images of an interior portion of the vehicle. While only one camera 404 is shown, more than one camera could be used.

At some point, the user 400 may wish to turn off the audio system. To this end, the user 400 may make a tapping gesture in a region that includes an ear 400 of the user. This is illustrated in FIG. 4B, which shows a detailed view of a portion 406 of FIG. 4A. As shown in FIG. 4B, the user 400 is using his or her hand 408 to make a tapping gesture on an ear 410 of the user 400.

The camera 404 may record three-dimensional images of the tapping gesture in the region that includes the ear 410 of the user 400. Based on the three-dimensional images, the vehicle may detect the tapping gesture in the region that includes the ear 410 of the user 400.

The vehicle may then select, based on the correlation, a function associated with the tapping gesture in the region that includes the ear 410 of the user 400. For example, the tapping gesture in the region that includes the ear 410 of the user 400 may be associated with the function of turning off the audio system, as described above. Other examples are possible as well.

Once the vehicle has selected the function from the correlation, the vehicle may initiate the function in the vehicle. That is, the vehicle may turn off the audio system.

As shown in FIG. 4C, the audio system indicator 402 on the display indicates that the audio system has been turned off. The audio system indicator 402 may serve as a visual feedback to the user 400, allowing the user 400 to confirm that the audio system has been turned off. In some embodiments, the vehicle may trigger a haptic or audible feedback instead of or in addition to the visual feedback, or may not trigger any feedback at all.

FIG. 5 shows an example correlation 500 between gestures, regions, and functions, in accordance with an embodiment. As shown, the correlation 500 includes a plurality of predetermined gestures 502, in combination with a plurality of predetermined regions 504 of a vehicle, and a plurality of functions 506. In particular, each gesture in the plurality of predetermined gestures 502, in combination with a particular region of the plurality of predetermined regions 504, is associated with a particular function in the plurality of functions 506.

A common gesture may be associated with two different regions, and the common gesture may be associated with different functions, depending on the different regions. For example, as shown, a swipe up gesture in a region that includes an air-conditioning vent is associated with a function of increasing a fan speed, while a swipe up gesture in a region that includes a driver window is associated with a function of closing the driver window.

Similarly, a common region may be associated with two different gestures, and the common region may be associated with different functions, depending on the different gestures. For example, as shown, a swipe up gesture in a region that includes an air-conditioning vent is associated with a function of increasing a fan speed, while a swipe down gesture in the region that includes the air-conditioning vent is associated with a function of decreasing the fan speed. Further, as shown, a swipe right gesture in the region that includes the air-conditioning vent is associated with a function of increasing a temperature, while a swipe left gesture in the region that includes the air-conditioning vent is associated with a function of decreasing the temperature.

In some embodiments, the correlation 500 may be pre-set, and a user of the vehicle may learn the correlation 500 in order to interact with the vehicle. In other embodiments, the correlation 500 may be generated during a set-up process with the user, and the user may select the gestures, regions, and functions that are to be correlated in the correlation. In these embodiments, the vehicle may maintain different correlations for different users, and may determine which correlations to use by identifying the user (e.g., through facial recognition, detection of a key fob, user input of a passcode or other identifier, etc.) In still other embodiments, the correlation 500 may be a combination of pre-set elements and selected elements, where some of the gestures, regions, and functions are pre-set and some of the gestures, regions, and functions are selected by a user.

While a number of example gestures, regions, and functions are shown, it is to be understood that the example gestures, regions, and functions are merely illustrative and are not meant to be limiting. Other gestures, regions, and functions, and combinations thereof, are possible as well.

Systems in which example embodiments of the above example methods may be implemented will now be described in greater detail. In general, an example system may be implemented in or may take the form of a vehicle. The vehicle may take a number of forms including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Figure 6:
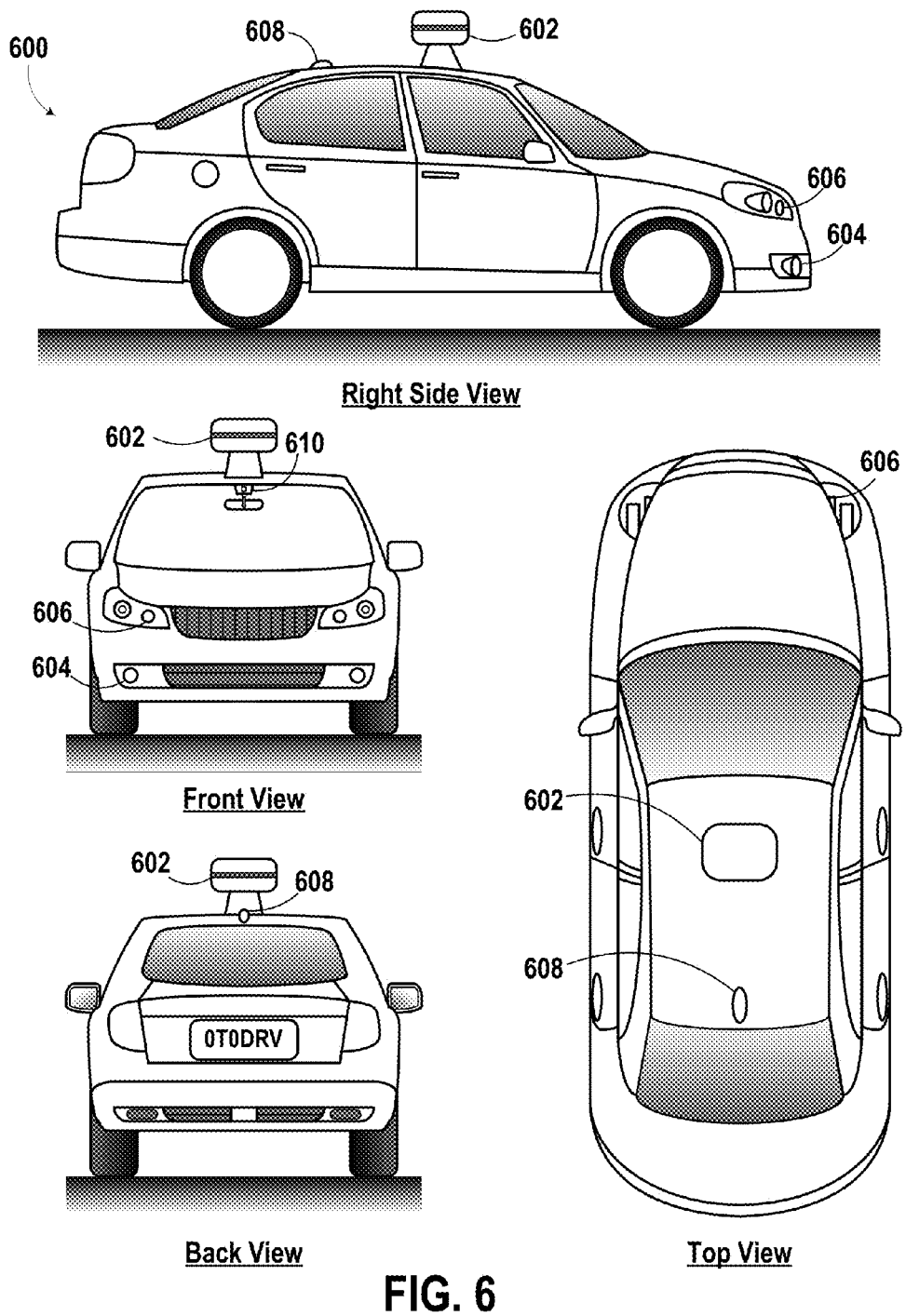
FIG. 6 illustrates an example vehicle, in accordance with an embodiment.

FIG. 6 illustrates an example vehicle 600, in accordance with an embodiment. While the vehicle 600 in FIG. 6 is configured to operate in an autonomous mode, in some embodiments the above methods may be implemented in a vehicle that is not configured to operate in an autonomous mode.

FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and an exterior camera 610.

Each of the first, second, and third sensor units 602-606 may include any combination of global positioning system sensors, inertial measurement units, radio detection and ranging (RADAR) units, laser rangefinders, light detection and ranging (LIDAR) units, exterior cameras, and acoustic sensors. Other types of sensors are possible as well.

While the first, second, and third sensor units 602-606 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or over an air interface. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown to be positioned on a roof of the vehicle 600, in other embodiments the wireless communication system 608 could be located, fully or in part, elsewhere.

The exterior camera 610 may be any camera (e.g., a still camera, a video camera, etc.) configured to capture images of the environment in which the vehicle 600 is located. To this end, the exterior camera 610 may be configured to detect visible light, or may be configured to detect light from other portions of the spectrum, such as infrared or ultraviolet light, or x-rays. Other types of cameras are possible as well. The exterior camera 610 may be a two-dimensional detector, or may have a three-dimensional spatial range. In some embodiments, the exterior camera 610 may be, for example, a range detector configured to generate a two-dimensional image indicating a distance from the exterior camera 610 to a number of points in the environment. To this end, the exterior camera 610 may use one or more range detecting techniques. For example, the exterior camera 610 may use a structured light technique in which the vehicle 600 illuminates an object in the environment with a predetermined light pattern, such as a grid or checkerboard pattern and uses the exterior camera 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the exterior camera 610 may use a laser scanning technique in which the vehicle 600 emits a laser and scans across a number of points on an object in the environment. While scanning the object, the vehicle 600 uses the exterior camera 610 to detect a reflection of the laser off the object for each point. Based on a length of time it takes the laser to reflect off the object at each point, the vehicle 600 may determine the distance to the points on the object. As yet another example, the exterior camera 610 may use a time-of-flight technique in which the vehicle 600 emits a light pulse and uses the exterior camera 610 to detect a reflection of the light pulse off an object at a number of points on the object. In particular, the exterior camera 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The exterior camera 610 may take other forms as well.

In some embodiments, the exterior camera 610 may include a movable mount and/or an actuator, as described above, that are configured to adjust the position and/or orientation of the exterior camera 610 by moving the exterior camera 610 and/or the movable mount.

While the exterior camera 610 is shown to be mounted on a front windshield of the vehicle 600, in other embodiments the exterior camera 610 may be mounted elsewhere on the vehicle 600, either inside or outside the vehicle 600.

The vehicle 600 may include one or more other components in addition to or instead of those shown.

Figure 7:
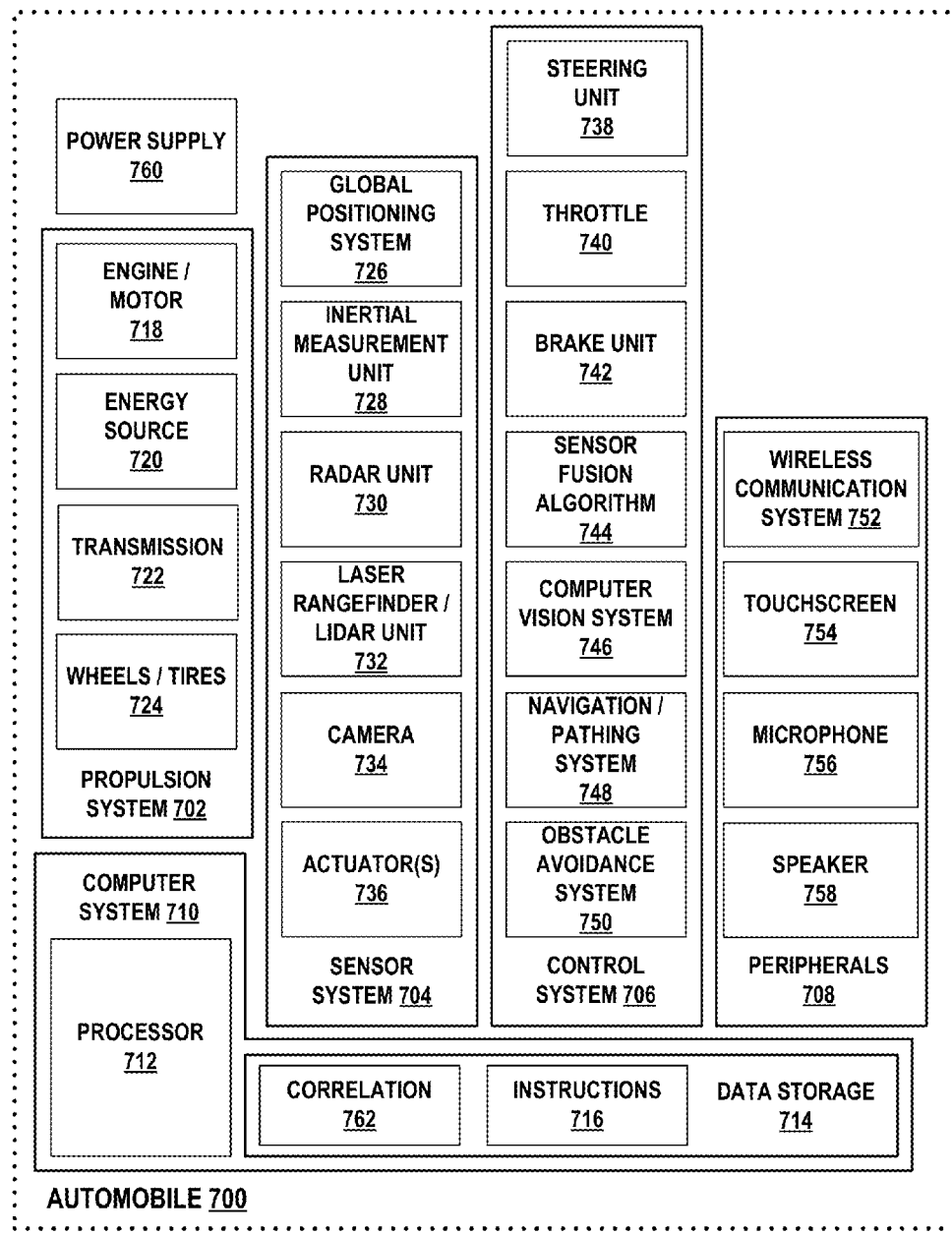
FIG. 7 is a simplified block diagram of an example vehicle, in accordance with an embodiment.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well. While the vehicle 700 in FIG. 7 is described as being configured to operate in an autonomous mode, in some embodiments the above methods may be implemented in a vehicle that is not configured to operate in an autonomous mode. In these embodiments, the vehicle may include fewer and/or different systems and/or components.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of the vehicle 700 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The camera 734 may be any camera (e.g., a still camera, a video camera, etc.) configured to record three-dimensional images of an interior portion of the vehicle 700. To this end, the camera 734 may be, for example, a depth camera. Alternatively or additionally, the camera 734 may take any of the forms described above in connection with the exterior camera 610. In some embodiments, the camera 734 may comprise multiple cameras, and the multiple cameras may be positioned in a number of positions on the interior and exterior of the vehicle 700.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles (e.g., in embodiments where the camera 734 includes multiple cameras, including a camera mounted on the exterior of the vehicle 700). To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for the vehicle 700.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the camera 734 to record three-dimensional images of an interior of the vehicle. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIGS. 1 and 3A-4C. Further, data storage 714 may contain a correlation 762 for the vehicle 700, which may take any of the forms described above. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

Still further, while the above description focused on a vehicle 700 configured to operate in an autonomous mode, in other embodiments the vehicle may not be configured to operate in an autonomous mode. In these embodiments, for example, one or more of the following components may be omitted: the global positioning system 726, the inertial measurement unit 728, the RADAR unit 730, the laser rangefinder or LIDAR unit 732, the actuators 736, the sensor fusion algorithm 744, the computer vision system 746, the navigation or pathing system 748, the obstacle avoidance system 750, the wireless communication system 752, the touchscreen 754, the microphone 756, and the speaker 758.

The vehicle 700 may take other forms as well.

Figure 8:
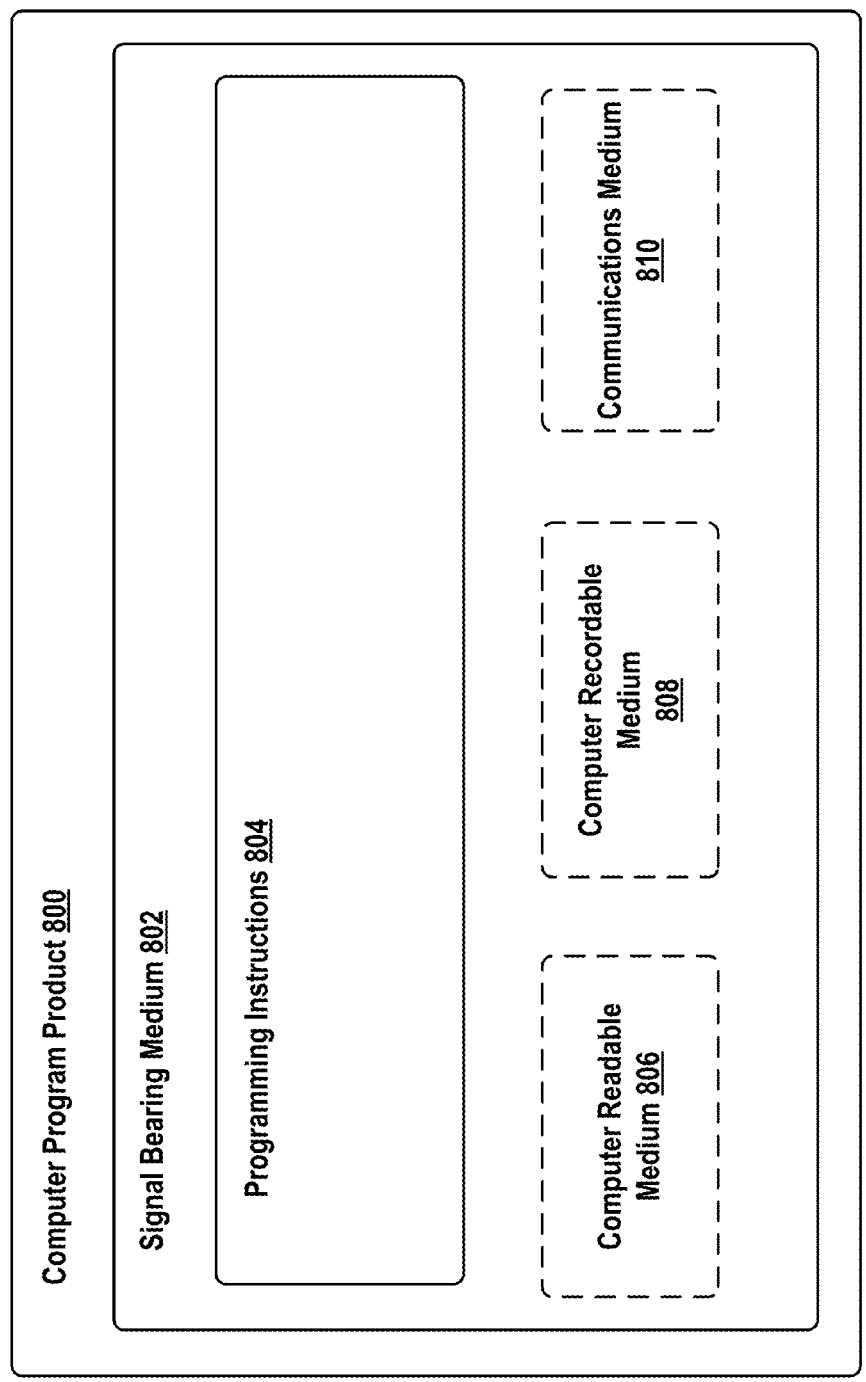
FIG. 8 is a simplified block diagram of an example computer program product, in accordance with an embodiment.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality, such as some or all of the functionality described above with respect to FIGS. 1 and 3A-4C.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device (e.g., the computer system 710 of FIG. 7) may be configured to provide various operations, functions, or actions in response to the programming instructions 804 being conveyed to the computing device by one or more of the computer readable medium 806, the computer recordable medium 808, and/or the communications medium 810.

The non-transitory computer readable medium may also be distributed among multiple data storage elements, which could be remotely located from each other.

In some embodiments, the computing device that executes some or all of the programming instructions 804 could be a vehicle, such as the vehicle 700 illustrated in FIG. 7. Other computing devices are possible as well.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
maintaining, by a computer system, a correlation between a plurality of predetermined gestures, in combination with a plurality of predetermined regions of a vehicle, and a plurality of functions, such that each gesture in the plurality of predetermined gestures, in combination with a particular region of the plurality of predetermined regions, is associated with a particular function in the plurality of functions, wherein the plurality of predetermined regions comprise a first region associated with a first controllable component of the plurality of controllable components and a second region associated with a second controllable component of the plurality of controllable components;
recording three-dimensional images of an interior portion of the vehicle;
based on the three-dimensional images, detecting, by the computer system, a given gesture and a position of the given gesture, wherein the given gesture corresponds to one of the plurality of predetermined gestures;
determining, by the computer system, that the position of the given gesture corresponds to the first region rather than the second region;
responsive to determining that the position of the given gesture corresponds to the first region rather than the second region, selecting, by the computer system and based on the correlation, a function associated with the given gesture in combination with the first region; and
controlling, by the computer system, the first controllable component of the vehicle based on the function.

2. The method of claim 1, wherein the three-dimensional images are recorded using at least one of a depth camera and a three-dimensional laser scanner.

3. The method of claim 1, further comprising, in response to detecting the given gesture, triggering at least one of an audible feedback, a visual feedback, and a haptic feedback.

4. The method of claim 1, wherein the three-dimensional images are recorded from a ceiling of the vehicle.

5. The method of claim 1, further comprising:
determining an extent of the given gesture; and
determining an operational parameter related to the function based on the extent,
wherein controlling the first controllable component of the vehicle based on the function comprises controlling the first controllable component of the vehicle based on the function and the operational parameter.

6. The method of claim 1, wherein recording three-dimensional images of an interior portion of the vehicle comprises recording three-dimensional images of the interior portion of the vehicle from a first position and recording three-dimensional images of the interior portion of the vehicle from a second position.

7. The method of claim 1, wherein the first region of the vehicle includes an interior surface of the vehicle.

8. The method of claim 7, wherein the interior surface comprises at least one of a dashboard of the vehicle, a steering wheel of the vehicle, an air-conditioning vent, a seat of the vehicle, a headrest of the vehicle, an arm rest of the vehicle, a rear-view mirror of the vehicle, a window of the vehicle, a driver of the vehicle, and a passenger of a vehicle.

9. The method of claim 1, wherein the first controllable component comprises a controllable component selected from the group consisting of: an air conditioning system, heater, climate control system, cruise control system, audio system, seat, window, windshield wipers, entertainment system, display, or sunscreen in the vehicle.

10. A vehicle comprising:
a camera configured to record three-dimensional images of an interior portion of the vehicle;
a plurality of controllable components;
at least one processor; and
data storage comprising:
(i) a correlation between a plurality of predetermined gestures, in combination with a plurality of predetermined regions of the vehicle, and a plurality of functions, such that each gesture in the plurality of predetermined gestures, in combination with a particular region of the plurality of predetermined regions, is associated with a particular function in the plurality of functions, wherein the plurality of predetermined regions comprise a first region associated with a first controllable component of the plurality of controllable components and a second region associated with a second controllable component of the plurality of controllable components, and
(ii) instructions executable by the at least one processor to:
(a) record three-dimensional images of an interior portion of the vehicle,
(b) based on the three-dimensional images, detect a given gesture and a position of the given gesture, wherein the given gesture corresponds to one of the plurality of predetermined gestures,
(c) determine that the position of the given gesture corresponds to the first region rather than the second region,
(d) responsive to determining that the position of the given gesture corresponds to the first region rather than the second region, select, based on the correlation, a function associated with the given gesture in combination with the first region, and
(e) control the first controllable component based on the function.

11. The vehicle of claim 10, wherein the camera comprises at least one of a depth camera and a three-dimensional laser scanner.

12. The vehicle of claim 10, further comprising at least one feedback mechanism configured to provide feedback in response to detecting the given gesture.

13. The vehicle of claim 12, wherein the at least one feedback mechanism comprises at least one of an audible feedback mechanism, a visual feedback mechanism, and a haptic feedback mechanism.

14. The vehicle of claim 10, wherein the camera is positioned on a ceiling of the vehicle.

15. The vehicle of claim 10, wherein the first controllable component comprises a controllable component selected from the group consisting of: an air conditioning system, heater, climate control system, cruise control system, audio system, seat, window, windshield wipers, and a sunscreen.

16. The vehicle of claim 10, further comprising an additional camera configured to record additional three-dimensional images of an additional interior portion of the vehicle.

17. The vehicle of claim 16, wherein detecting the gesture is further based on the additional three-dimensional images.

18. The vehicle of claim 10, wherein the vehicle is configured to operate in an autonomous mode.

19. A non-transitory computer-readable medium having stored therein instructions executable by a computing device to cause the computing device to perform the functions of:
maintaining a correlation between a plurality of predetermined gestures, in combination with a plurality of predetermined regions of a vehicle, and a plurality of functions, such that each gesture in the plurality of predetermined gestures, in combination with a particular region of the plurality of predetermined regions, is associated with a particular function in the plurality of functions, wherein the plurality of predetermined regions comprise a first region associated with a first controllable component of the plurality of controllable components and a second region associated with a second controllable component of the plurality of controllable components;

recording three-dimensional images of an interior portion of the vehicle;

based on the three-dimensional images, detecting a given gesture and a position of the given gesture, wherein the given gesture corresponds to one of the plurality of predetermined gestures and the given region corresponds to one of the plurality of predetermined regions;

determining that the position of the given gesture corresponds to the first region rather than the second region;

responsive to determining that the position of the given gesture corresponds to the first region rather than the second region, selecting, based on the correlation, a function associated with the given gesture in combination with the first region; and controlling the first controllable component of the vehicle based on the function.

20. The non-transitory computer-readable medium of claim 19, wherein the computing device is in the vehicle.

* * * * *